UNITED STATES PATENT OFFICE 2,146,392

QUATERNARY AMMONIUM SALTS

Alfred William Baldwin and Eric Everard Walker, Blackley, Manchester, England, assignors to Imperial Chemical Industries Limited, a corporation of Great Britain No Drawing. Application May 10, 1937, Serial No. 141,868. In Great Britain May 13, 1936

23 Claims. (Cl. 260—296)

This invention relates to the manufacture of new quaternary ammonium salts.

According to the invention we manufacture new quaternary ammonium salts by reacting together, in presence of free tertiary heterocyclic base (namely, pyridine, a C-alkylpyridine or quinoline), an acid amide of the formula $RCONH_2$, where R is an aliphatic hydrocarbon radicle, formaldehyde and a salt of the said tertiary base and/or an addition compound of the said tertiary base with an inorganic anhydride.

Alternatively according to the invention we manufacture the new quaternary salts by reacting together in presence of free tertiary heterocyclic base as defined, a hydroxymethylamide (obtainable from interaction of formaldehyde and an amide of the formula $RCONH_2$ as defined above), a salt of said tertiary base and/or an addition compound of said tertiary base with an inorganic anhydride.

For the purposes of the present invention the term "formaldehyde" is intended to include also such polymers of formaldehyde as, for example, paraformaldehyde.

The reaction may conveniently be brought about by heating the reagents at moderately raised temperatures, for example, 50–100° C. Where the mixed reagents are solid or pasty at the temperature at which it is desired to operate, an amount of free tertiary base sufficient to act as a diluent, that is to keep the reaction mass in fluid condition, may be used with advantage. However, if desired, other diluents such as chloroform or hydrocarbon solvents, for example, benzene or toluene, may be used.

As already indicated, the tertiary bases to be used in the process of the present invention are pyridine, C-alkylpyridines such as picoline and lutidine, or quinoline. Conveniently in this connection we may use the so-called "pyridine bases" which are technical mixtures in which pyridine and C-alkylpyridines such as lutidine and picoline are present in varying amounts.

Among the tertiary base salts suitable for use according to the invention are, for example, pyridine hydrochloride, pyridine hydrobromide, pyridine m-nitro benzene sulphonate, pyridine nitrate, pyridine sulphate and pyridine p-toluene sulphonate. Similarly, corresponding salts of C-alkylpyridines, quinoline or the above mentioned "pyridine bases" may be used.

A suitable tertiary base addition compound for use according to the invention is, for example, the addition compound of pyridine with sulphur trioxide, which may be conveniently prepared as described in British specification 317,736 or as described by Baumgarten (Berichte der deutschen Chemische Gesellschaft, 1926, 59, pages 1166–1169). A mixture of a tertiary base salt and a tertiary base addition compound such as is produced, for example, by the reaction of chlorsulphonic acid on pyridine (see Baumgarten, loc. cit.) may be used as a reagent according to the invention. Again, there may be used, for example, the addition compound of pyridine and the anhydride of sulphurous acid, that is, sulphur dioxide (see André, Comptes Rendues, 130, 1714).

As amide starting materials we may use, for example, acetamide, propionamide, oleamide, lauramide, stearamide, the amides of the fatty acids of coconut oil, palm oil, cotton seed oil, tallow or of derived acids such as those obtained by fat hydrogenation. Similarly the corresponding hydroxymethylamides may be used in the alternative process of the invention.

The new quarternary ammonium salts obtained according to the present invention correspond to the general formula

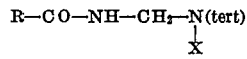

where R stands for an aliphatic hydrocarbon radicle, N(tert) stands for the nucleus of a molecule of pyridine, a C-alkylpyridine or quinoline and X stands for the monovalent anion of an acid. In general they are solids which are soluble in warm water, those derived from higher fatty acid amides giving aqueous solutions which foam readily on shaking. The aqueous solutions gradually lose their foaming when boiled. The new salts are in general soluble in pyridine, chloroform and also, although some sparingly so, in acetone. In general they are sparingly soluble in ether. The new salts, more particularly those containing the hydrocarbon radicle of a higher fatty acid are useful as agents in textile treatment processes. Like many other quaternary ammonium derivatives of long-chain alkyl compounds, they are useful as wetting, penetrating and softening agents for textile fiber. But a special characteristic of the new compounds is their capacity to impart permanent water-repellent characteristics to cellulosic textile material. They further exhibit the unusual property of fixing starch upon cellulosic fabric whereby to render the same resistant to washing.

The invention is illustrated but not limited by the following examples in which the parts are by weight.

Example 1

33 parts of sodium pyrosulphate and 50 parts of pyridine are heated together at 90°–95° C. for 30 minutes. The resulting mixture of pyridine-sulphur trioxide and pyridine is cooled to 45°–50° C. and 31.3 parts of stearohydroxymethylamide are added. The reaction mixture is stirred at 45°–50° C. until (about 30 minutes) a test sample dissolves readily in water to give a clear foaming solution. The reaction mixture is then filtered. The filtrate on cooling is a viscous liquid from which, by adding acetone, there is thrown down a white crystalline precipitate which is filtered off, washed with acetone and dried. There is thus obtained a new quaternary salt, stearamidomethylpyridinium sulphate corresponding to the formula

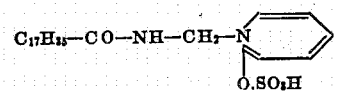

in the form of a white crystalline powder. The new quaternary salt is almost insoluble in acetone and dissolves in warm water to give clear foaming solutions.

Alternatively, the new quaternary salt which is sparingly soluble in ice-water, may be isolated from the reaction mixture or the viscous filtrate by diluting with ice-water. The suspension so obtained is filtered whilst ice-cold and the product washed with ice-water. The new quaternary salt is thus obtained as a white powder which is soluble in warm water to give clear, foaming solutions.

The stearohydroxymethylamide used as starting material is a new compound. It is prepared as follows:—

28.3 parts of stearamide, 3 parts of paraformaldehyde, 7 parts of pulverized anhydrous potassium carbonate and 50 parts of benzene are stirred together at 50° C. In a short time reaction takes place, the temperature rises sharply to about 60° C. and the reaction mixture becomes a stiff, white paste. The pasty mass is allowed to cool and is then filtered, pressed, dried, washed free from potassium carbonate with warm water and again dried. The new compound is a light coloured powder. It is very sparingly soluble in acetone or benzene, but soluble in methyl alcohol from which it may be crystallized as white needles, M. P. 115° C.

Example 2

12 parts of stearohydroxymethylamide, 8 parts of anhydrous pyridine hydrochloride and 20 parts of pyridine are stirred together at 70°–80° C. until a test sample of the reaction mixture dissolves in water to give clear solutions. The reaction mixture is then distilled at 60°–70° C. under reduced pressure to remove pyridine. Acetone is then added to the distillation residue which is a viscous mass, whereby the new quaternary salt is precipitated in the form of white needles. The new quaternary salt, stearamidomethylpyridinium chloride, thus obtained when purified, if necessary by re-crystallization from acetone, gives analyses corresponding to the formula

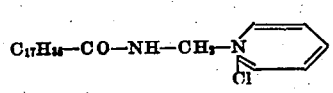

The new quaternary salt is readily soluble in warm water to give clear foaming solutions.

Example 3

10 parts of stearamide, 2 parts of paraformaldehyde, 10 parts of anhydrous pyridine hydrochloride and 40 parts of pyridine are heated and stirred under reflux at 70°–80° C. until a test sample of the reaction mixtures gives a clear solution in water. The excess of pyridine is then removed from the reaction mixture by distillation at 60°–70° C. under reduced pressure. Acetone is then added to the distillation residue whereby there is thrown down a precipitate in the form of white needles which are filtered off and dried. The stearamidomethylpyridinium chloride so obtained may be further purified if desired by re-crystallization from acetone.

If, in the above example, the pyridine hydrochloride is replaced by molecular equivalent amounts of pyridine hydrobromide, pyridine nitrate or pyridine-m-nitrobenzene sulphonate, the corresponding stearamidomethylpyridinium salts having similar properties are obtained.

Example 4

A mixture of pyridine hydrochloride and pyridine is made by passing gaseous hydrogen chloride into 100 parts of pyridine until an increase in weight of 9.1 parts is obtained. To the mixture is then added 6 parts of paraformaldehyde and 20 parts of lauramide. The whole is then stirred at 60° C. for 5 hours. The reaction mass is then cooled and diluted with ether whereby there is thrown down a white crystalline precipitate which is filtered off and dried. The crude lauramidomethylpyridinium chloride so obtained dissolves in warm water to give clear foaming solutions. The moist crystalline precipitate of the crude quaternary salt may be purified if desired by mixing with cold chloroform, removing the upper oily layer containing moist pyridine hydrochloride which separates and then reprecipitating the quaternary salt from the lower chloroform layer by addition of ether.

Lauramidomethylpyridinium chloride has the formula

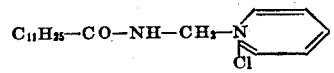

By using the amide of mixed coconut oil fatty acids instead of lauramide in the above example there is obtained a new quaternary salt having similar properties to that described above.

Example 5

To a mixture of pyridine hydrochloride and pyridine obtained as described in Example 4 there is added 6 parts of paraformaldehyde and 7.3 parts of propionamide. The whole is stirred and heated at 60° C. for 4 hours. The reaction mixture is then cooled, mixed with an equal bulk of ether, the lower oily layer which separates is removed and washed with a further quantity of ether. The washed oil is then shaken up with cold chloroform, allowed to stand and the lower layer separated off and washed with ether. There is thus obtained propionamidomethylpyridinium chloride in the form of an oil which is completely soluble in water.

Propionamidomethylpyridinium chloride corresponds to the formula

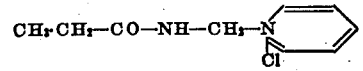

Example 6

A mixture of 30 parts of acetamide, 30 parts of paraformaldehyde, 155 parts of pyridine hydrochloride and 150 parts of pyridine is heated and stirred at 60° C. for 5 hours. From the resulting reaction mixture there is isolated acetamidomethylpyridinium chloride in the form of an oil by a similar procedure to that described in Example 5. The new quaternary salt is readily soluble in warm water.

Example 7

30 parts of pyridine and 10 parts of sodium pyrosulphate are heated together at 90°–100° C. for 1 hour. The resulting mixture containing pyridine-sulphur trioxide and free pyridine is cooled to 50° C. and then 10.5 parts of stearamide and 2.25 parts of paraformaldehyde are added. The whole is then stirred at 50° C. for 24 hours. From the resulting reaction mixture stearamidomethylpyridinium sulphate may be isolated in a manner similar to that described in Example 1.

Example 8

2.4 parts of gaseous hydrogen chloride are passed into 36 parts of pyridine. 7.5 parts of the hydroxymethylamide of oleic acid (M. P. 77°–80° C.) are added and the mixture is stirred at 50°–60° C. for 5 hours. There is thus obtained a pyridine solution containing oleylamidomethylpyridinium chloride which solution may, if desired, be used for textile treatment purposes. The crude quaternary salt may be isolated as a crystalline hygroscopic solid by cooling the reaction mixture to 0° C., adding acetone or ether, filtering off the precipitate so obtained and drying in vacuo at atmospheric temperature.

Oleylamidomethylpyridinium chloride has the formula

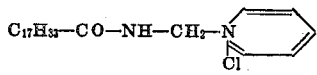

Example 9

9 parts of finely powdered anhydrous oxalic acid are stirred into 100 parts of pyridine at 60° C. 10 parts of stearohydroxymethylamide are then added and the whole stirred at 60° C. for 4 hours. The temperature is then raised at 70°–80° C. and stirring continued at that temperature for 12 hours. The reaction mixture is cooled, diluted with acetone and the white crystalline precipitate so obtained is filtered off. The crude stearamidomethylpyridinium oxalate thus obtained is a white crystalline solid which is sparingly soluble in methyl alcohol or chloroform. It is sparingly soluble in hot water to give clear foaming solutions. If desired the new quaternary salt may be further purified by re-crystallization from hot pyridine, followed by washing with acetone.

By using 13 parts of p-toluenesulphonic acid in place of anhydrous oxalic acid in the above example there is obtained stearamidomethylpyridinium p-toluene sulphonate which dissolves readily in warm water to give foaming solutions.

Example 10

Gaseous hydrogen chloride is passed into 50 parts of quinoline until an increase in weight of 3.5 parts has taken place. 10 parts of stearohydroxymethylamide are then added and the mixture is heated at 60° C. for 20 hours. The dark brown reaction mixture is cooled, diluted with ether and the new quaternary salt which is thus precipitated as a brownish, granular solid is filtered off. The new quaternary salt may be further purified by extracting with hot chloroform, filtering from insoluble matter and reprecipitating by addition of ether. Stearamidomethylquinolinium hydrochloride so obtained dissolves in water to give clear, pale-yellow, foaming solutions.

Example 11

To a mixture obtained by passing 18 parts of gaseous hydrogen chloride into 120 parts of pyridine there is added 23 parts of propionohydroxymethylamide (see Einhorn and Hamburger, Liebigs Annalen, 1908, 361, 122). The whole is then stirred at 50°–60° C. for 5 hours. The resulting colourless syrup is cooled, shaken with an equal bulk of ether and the lower oily layer separated off. This oil is dissolved in chloroform, ether is added and the oil which separates is removed and washed with ether. The propionamidomethylpyridinium chloride thus obtained as an oil deposits crystals of crude quaternary salt after standing for some days at atmospheric temperature under vacuum. These crystals may be further purified, if desired, by dissolving in chloroform and reprecipitating with ether.

Example 12

5 parts of 95% nitric acid are added gradually to 10 parts of pyridine and the resulting solution evaporated to dryness. The dry pyridine nitrate so obtained is dissolved in 100 parts of pyridine and 10 parts of stearohydroxymethylamide are added to the solution. The whole is then heated and stirred at 60° C. for 1½ hours. The reaction mixture is then cooled, diluted with an equal bulk of acetone and the white crystalline precipitate so produced is filtered off, washed with acetone and dried. The stearamidomethylpyridinium nitrate so obtained may be further purified if desired by extracting with chloroform, filtering the chloroform extract from any insoluble residue and then reprecipitating the quaternary salt from the clear filtrate by addition of ether.

Stearamidomethylpyridinium nitrate is a white crystalline solid which dissolves in warm water to give clear foaming solutions. These aqueous solutions when boiled gradually lose their foaming power.

As already indicated, temperatures from 50°–100° C. are convenient for carrying out the reaction. At temperatures below 50° C. the reaction proceeds too slowly to be convenient in practice. Temperatures above 100° C. may be used but in general higher temperatures offer no particular advantage in either rate of reaction or yield. The reaction temperature necessary to give optimum yields varies with the amide or hydroxymethylamide to be reacted and also in part with the particular proportions of reactants used. In general, the reaction temperature giving optimum yields will be found to lie within the range 50°–80° C. From their constitution the new quaternary salts may be considered theoretically as being formed by the union of one molecule of amide with one molecule of formaldehyde and one molecule of a salt of a tertiary base. In practice, an excess of the last two named reactants is desirable if maximum yields are to be obtained. Thus, for example, if 1 molecule of stearamide or methylolstearamide is to be reacted it is advantageous to use about 2–3 molecules of pyridine salt, for example, pyridine hydrochloride. Larger amounts of pyridine salt may be used but there is not generally any practical advantage gained thereby. If only 1 molecule of pyridine salt is used the reaction will proceed but the yields are lower. Similarly, where the starting material is, for example, stearamide it is advantageous to use an excess of formaldehyde, for example, a quantity of paraformaldehyde equivalent to from 2 to 3 moles of formaldehyde. It has been found that about 10 molecules of free pyridine has an advantageous effect on the yield of quaternary salt as well as acting as a convenient diluent for the reaction mixture. Greater amounts of free tertiary base may be used. If desired, part of the pyridine may be replaced by an inert diluent, for example, benzene as has already been indicated. With quantities of free pyridine lower 5 molecules there is a tendency for the yields to be adversely affected although the reaction proceeds. It is possible that excess of tertiary base in the reaction mixture has a stabilizing effect on the quaternary ammonium salts when formed.

From the foregoing it will be seen that there is considerable latitude in the choice of reactants, the proportion of reactants to be used and the reaction temperature without departing from the spirit of this invention.

In the claims below the expression "a salt of said tertiary base" shall be understood as a generic term including the reaction products of bases of the type discussed with acids or with acid anhydrides. Also, the term "formaldehyde" shall be understood as covering liquid formaldehyde, para-formaldehyde, or any other compound which yields formaldehyde in chemical reactions.

We claim:

1. A process for the manufacture of quaternary ammonium salts, which comprises reacting a salt of a tertiary base selected from the group consisting of pyridine, homologues of pyridine and quinoline, with formaldehyde and an acid amide of the general formula $RCONH_2$, wherein R stands for an aliphatic hydrocarbon radical, in the presence of the free tertiary base corresponding to said salt.

2. A process for the manufacture of quaternary ammonium salts, which comprises reacting together a salt of a tertiary base selected from the group consisting of pyridine, homologues of pyridine and quinoline, and a hydroxy-methyl-amide of the general formula $RCONHCH_2OH$, wherein R stands for an aliphatic hydrocarbon radical, in the presence of the free tertiary base corresponding to said salt.

3. The process which comprises reacting a primary amide of an aliphatic acid containing at least 10 carbon atoms with paraformaldehyde, pyridine and a compound selected from the group consisting of salts and inorganic acid anhydride addition compounds of pyridine.

4. The process which comprises reacting a hydroxymethylamide of an aliphatic acid containing at least 10 carbon atoms with pyridine and a compound selected from the group consisting of salts and inorganic acid anhydride addition compounds of pyridine.

5. The process which comprises reacting hydroxymethylstearamide with the addition compound of pyridine and a water-soluble, highly ionizable acid to produce a water-soluble stearamidomethylpyridinium salt.

6. The process which comprises reacting stearamide with paraformaldehyde and pyridine hydrochloride in presence of pyridine to form a water-soluble stearamidomethylpyridinium salt.

7. The process which comprises reacting hydroxymethylstearamide with pyridine hydrochloride in presence of pyridine to form a water-soluble stearamidomethylpyridinium salt.

8. New quaternary salts of the formula

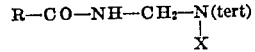

where R stands for an aliphatic hydrocarbon radicle, N(tert) stands for the molecule of a base selected from the group consisting of pyridine, C-alkylpyridines and quinoline, and X stands for the anion of a salt forming acid.

9. New quaternary salts of the formula

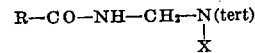

where R stands for an aliphatic hydrocarbon radicle of at least 10 carbon atoms, N(tert) stands for the molecule of a base selected from the group consisting of pyridine, C-alkylpyridine and quinoline, X stands for the anion of a salt-forming acid.

10. New quaternary salts of the formula

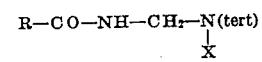

where R stands for the radicle of the acid of a fat or fatty oil, N(tert) stands for the molecule of a base selected from the group consisting of pyridine, C-alkylpyridines and quinoline, and X stands for the anion of a salt-forming acid.

11. New quaternary salts of the formula

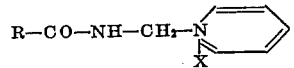

where R stands for an aliphatic hydrocarbon radicle of at least 10 carbon atoms and X stands for the anion of a salt-forming acid.

12. New quaternary salts of the formula

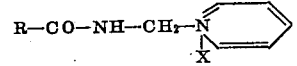

where R stands for an aliphatic hydrocarbon radicle of at least 10 carbon atoms and X stands for halogen.

13. Stearamidomethylpyridinium chloride of the formula

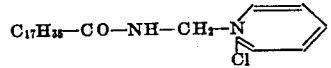

14. The process for the manufacture of quaternary ammonium compounds, which comprises reacting together formaldehyde, an acid amide of the general formula $RCONH_2$, wherein R is an aliphatic hydrocarbon radical, and a salt of a tertiary, heterocyclic, nitrogenous base, in the presence of the free base corresponding to said salt, the latter being present in sufficient quantity to act as a liquid medium for the reaction.

15. The process which comprises reacting together formaldehyde, an acid amide of the general formula $RCONH_2$ wherein R is an aliphatic hydrocarbon radical, and a compound selected from the group consisting of salts and inorganic acid-anhydride-addition-compounds of a tertiary, heterocyclic, nitrogenous base, in the presence of a liquid organic diluent.

16. The process which comprises reacting together formaldehyde, a hydroxy-methyl-amide of the general formula $RCONHCH_2OH$, wherein R is an aliphatic hydrocarbon radical, and a compound selected from the group consisting of salts and inorganic-acid-anhydride-additioncompounds of a tertiary heterocyclic, nitrogenous base, in the presence of an organic liquid diluent which is non-reactive toward formaldehyde.

17. The process which comprises heating together at a temperature between 50° and 100° C. an aliphatic acid amide of the general formula $RCONH_2$, wherein R is an aliphatic hydrocarbon radical, formaldehyde, and an inorganic-acid-addition-compound of a tertiary base selected from the group consisting of pyridine, C-alkylpyridines, and quinoline, in the presence of an organic diluent which is inert toward formaldehyde under the conditions indicated.

18. A process as in claim 17, the diluent being the free base corresponding to the acid addition compound employed.

19. A process as in claim 17, the formaldehyde and the acid addition compound being employed in the ratio of 2 to 3 mols of each per mol of the aliphatic acid amide, and the diluent being employed in a quantity corresponding at least to 5 mols of the diluent per mol of the acid amide.

20. Lauramidomethylpyridinium chloride of the formula

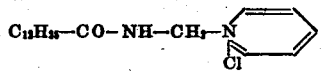

21. Stearamidomethylpyridinium oxalate, the same being a white crystalline solid which is sparingly soluble in methyl alcohol, chloroform and hot water.

22. A new compound of the group obtainable by reacting hydroxymethylstearamide, in presence of pyridine, with a compound selected from the group consisting of salts and addition compounds of pyridine, said new compound being water-soluble to give clear, foaming solutions.

23. The compound obtainable by reacting hydroxymethylstearamide with pyridine hydrochloride in presence of pyridine, said compound being soluble in warm water to give a foaming solution.

ALFRED WILLIAM BALDWIN.
ERIC EVERARD WALKER.